Aug. 28, 1951    A. EISELE    2,565,844

EQUALIZING AND ALIGNING MECHANISM FOR GAUGES

Filed May 9, 1946

INVENTOR.
Andrew Eisele
BY
Barthel + Bugbee
ATT'YS

Patented Aug. 28, 1951

2,565,844

UNITED STATES PATENT OFFICE 2,565,844

EQUALIZING AND ALIGNING MECHANISM FOR GAUGES

Andrew Eisele, Detroit, Mich.

Application May 9, 1946, Serial No. 668,567

9 Claims. (Cl. 33—178)

1

This invention relates to gauges, and in particular, to dial indicator gauges for measuring internal bores.

One object of this invention is to provide an internal bore dial indicator gauge having locating pins or equalizers with improved mechanism for synchronizing the motion thereof so that the locating pins or equalizers move inwardly or outwardly at the same rate of speed.

Another object is to provide an internal bore dial indicator gauge having locating pins or equalizers which are provided with rack teeth which are interconnected by a pinion device so that both locating pins move in synchronism and are positively maintained in synchronism.

Another object is to provide a gauge as set forth in the preceding objects wherein the locating pins or equalizers are arranged with their axes either parallel or at an angle to one another, their interconnecting and synchronizing mechanism functioning in either case to move them simultaneously at the same speed.

Another object is to provide a gauge as set forth in the preceding objects wherein the rack and pinion mechanism by which the locating pins or equalizers are synchronized, is adjustable by improved means so as to minimize lost motion and prevent errors.

Another object is to provide a gauge as set forth in the preceding objects wherein the rack and pinion mechanism for simultaneously moving and synchronizing the locating pins or equalizers is simple and compact, thereby enabling the mechanism to be mounted in an unusually small head and thereby adapting the gauge for use in measuring bores of exceedingly small diameters.

Other objects and advantages of the invention will become apparent during the course of the following description of the accompanying drawings, wherein.

This application is a continuation in part of my co-pending application, Serial No. 623,199, filed October 19, 1945, now Patent No. 2,484,697 issued October 11, 1949. In that application I have shown an internal bore dial indicator gauge having locating pins or equalizers with their axes arranged at an acute angle and with a bridge element and reciprocable contact plungers operatively interconnecting the locating pins. The dial indicator gauge of the present invention provides a simplified mechanism for synchronizing the motion of these locating pins and eliminates certain moving parts in the gauge disclosed and claimed in my above co-pending application.

Figure 1:
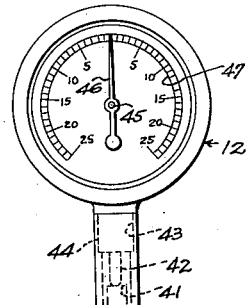
Figure 1 is a side elevation of an improved dial indicator gauge according to a preferred embodiment of the present invention.
Figure 2:
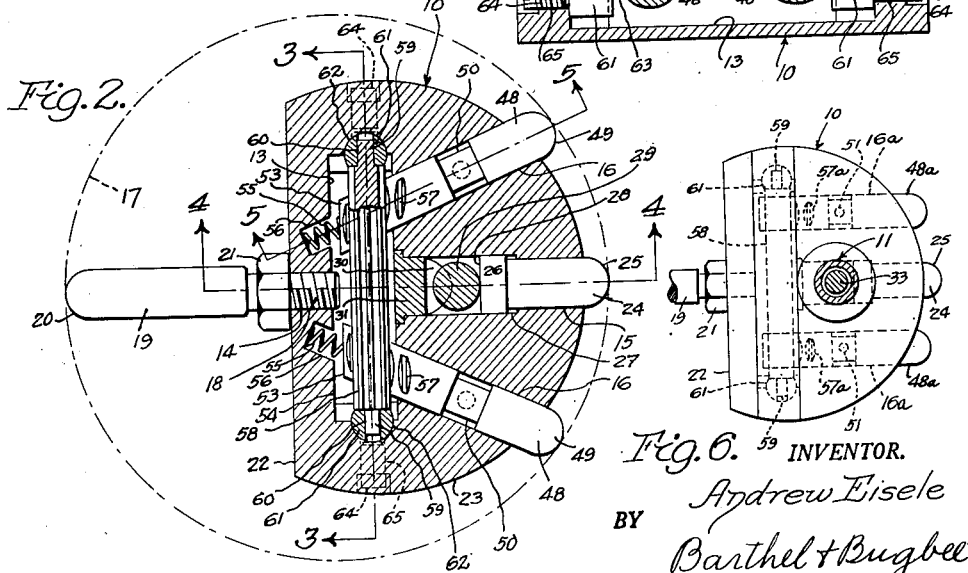
Figure 2 is a horizontal section taken approximately along the line 2—2 in Figure 1.

Referring to the drawings in detail, Figure 1 shows a preferred embodiment of an internal bore dial indicator gauge according to the invention as consisting of a head, shank and dial indicator, generally designated 10, 11 and 12 respectively. The head 10 is in the form of a segment of a cylinder having a substantially rectangular internal cavity 13 (Figure 2) into which extend central aligned bores 14 and 15 and inclined bores 16. The bores 16 are disposed with their axes at an acute angle to one another, in a generally radial direction, this angle being bisected by the axis of the bore 15. The bores 14, 15 and 16 extend outwardly from the cavity 13 toward the bore 17 whose diameter is to be measured (Figure 2). The bore 14 is threaded to receive the reduced diameter threaded portion 18 of a fixed measuring pin 19 having a rounded end 20 and is held in position by a lock nut 21 threaded upon the portion 18 and in abutment with the flat face 22 of the head 10. The fixed measuring pins are preferably provided in sets of different lengths, and are interchangeable, so as to adapt the gauge to the measurement of a wide range of bore diameters.

The bores 15, 16 and 17 extend outwardly through the arcuately curved face 23 of the head 10. Reciprocably mounted in the bore 15 is a movable measuring pin 24 having a rounded head 25 on its outer end and an annular enlargement 26 on its inner end. The enlargement 26 is reciprocable in an enlarged diameter counterbore 27 and its rear surface 28 engages a ball 29 of smaller diameter than the counterbore 27. The ball 29 on its opposite side engages the inclined inner end 30 of a plug 31 which closes the inner end of the counterbore 27 and serves as an abutment for the ball 29.

Figure 4:
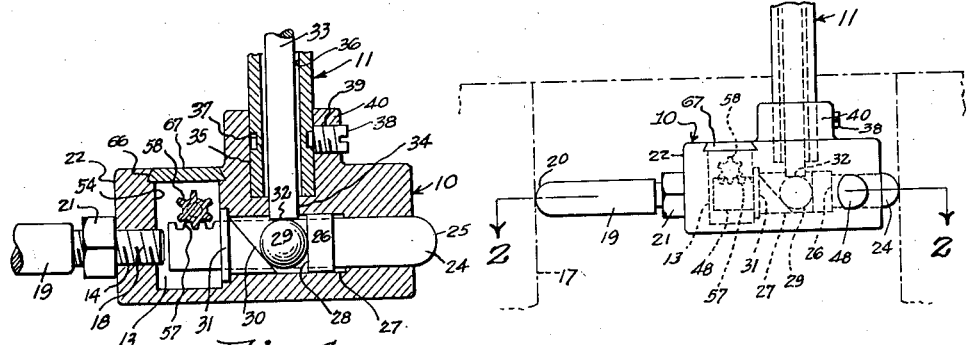
Figure 4 is a vertical section along the line 4—4 in Figure 2 along the axis of the measuring pins, showing the motion-transmitting mechanism thereof.

The upper portion of the ball 29 (Figure 4) is engaged by the lower end 32 of a motion-transmitting rod 33 which passes through a bore 34 in the head 10 and opens into a socket 35 which receives the lower end of the shank 11. The latter is tubular, and its longitudinal bore 36 houses the rod 33. The shank 11 is also provided with an annular groove 37 near its lower end, this groove receiving the small diameter end of a retaining screw 38 threaded into the transverse bore 39 in the boss 40 which contains the socket 35 and which rises from the head 10.

The upper end 41 of the rod 33 engages the lower end of the operating plunger 42 of the dial indicator 12 (Figure 1) and passes through a stem 43 thereof which is inserted in a counterbore 44 in the upper end of the shank 11. The dial indicator 12 is of a conventional type having the usual shaft 45 connected by conventional mechanism to the operating plunger 42. The plunger 42 is urged downwardly in the usual way by a spring (not shown) within the dial indicator 12. The shaft 45 carries a needle 46 which registers with a graduated scale 47 to indicate the travel of the plunger 42. By the above described train of mechanism, therefore, the motion of the movable measuring pin 24 is transmitted to the operating plunger 42 of the dial indicator 12 and is indicated by the travel of the needle over the graduated scale 47 thereof. The details of the dial indicator 12 are conventional and form no part of the present invention.

Figure 5:
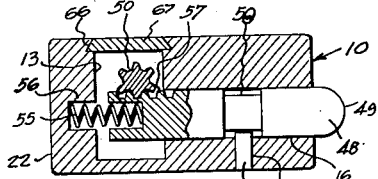
Figure 5 is a vertical section along the line 5—5 in Figure 2, showing the locating pin construction.

Reciprocably mounted in the bores 16 are elongated locating pins, plungers or equalizers 48 having rounded outer ends 49 (Figures 2 and 5) and intermediate annular grooves 50, the opposite ends of which serve as abutments for engaging the upper ends of retaining pins 51 projecting into the grooves 50 and mounted in the transverse bores 52 in the head 10. The pins 51 thus also serve as stops for limiting the reciprocation of the locating pins or plungers 48. The latter are provided with obliquely disposed inner ends 53 which are substantially parallel to the side wall 54 of the cavity 13 and are engaged by the ends of spiral springs 55, seated in obliquely directed sockets 56 opening into the cavity 13. In this manner, the springs 55 normally urge the locating pins 48 in an outward direction.

Figure 3:
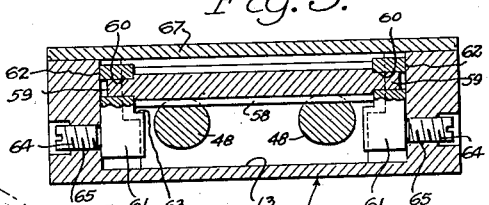
Figure 3 is a vertical section along the line 3—3 in Figure 2 through the axis of the pinion device for synchronizing the motion of the locating pins.

The locating pins 48 are provided on their upper rearward portions with oblique rack teeth 57 which mesh with the teeth of an elongated pinion 58. The pinion 58 is provided with reduced diameter end portions 59 which are journaled in bores 60 disposed transversely in short rod-like supports 61 (Figure 3) of partially circular cross-section. The supports 61 are slidably mounted in vertical bores 62 of partially circular cross-section (Figure 2) and are cut away as at 63 to provide clearances for the opposite ends of the pinion 58. The supports 61 are engaged by the inner ends of set screws 64 threaded through bores 65 in the opposite sides of the head pin. By this means, the supports 61 are adjustable vertically so as to adjust the pinion 58 relatively to the rack teeth 57 and thereby take up lost motion and consequently minimize errors. The upper side of the head 10 is provided with dove-tailed grooves 66 which receive the correspondingly beveled edges of an elongated cover plate 67. The latter provides access to the pinion 58 and its associated mechanism within the cavity 13 and closes it against the entry of dust and moisture, or other foreign matter.

Figure 6:
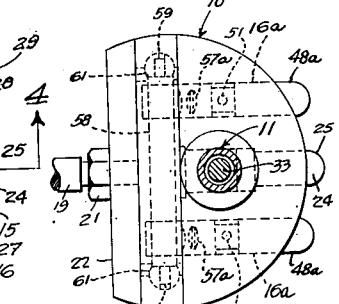
Figure 6 is a fragmentary top plan view of a modification of Figures 1 to 5 inclusive showing a gauge head with parallel locating pins.

The modification shown in Figure 6 is generally similar to the principal form of the invention shown in Figures 1 to 5 inclusive, and similar parts are similarly designated. In this modification, however, the bores 16a are parallel instead of being at an acute angle to one another, hence the pins 48a reciprocate along parallel axes. As a consequence, the rack teeth 57a extend transversely straight across the pins 48a instead of obliquely as in the principal form of the invention shown in Figure 2. The modification of Figure 6 is otherwise generally similar to the form shown in Figures 1 to 5 inclusive.

In the operation of the invention, a fixed measuring pin 19 of proper length for the diameter of the bore 17 to be measured, is selected and screwed into the bore 14 and locked in position by the nut 21. The pin 19 is, of course, adjusted until the rounded ends 20 and 25 are separated a predetermined known distance, as indicated upon the graduations 47. The latter are conventionally upon a rotatable mount so that the zero mark may be moved. In this way, the gauge is calibrated.

The gauge is then inserted into the bore 17 to be measured, with the pins 19 and 24 engaging the walls thereof at diametrically opposite points. As the locating pins or equalizers 48 enter the bore 17, they are pushed inwardly, their inward motion likewise shifting the rack teeth 57 inwardly. The pins 48 are forced to travel inwardly at the same rate of speed because of the engagement of the rack teeth 57 with the pinion 58. Accordingly, the pins 48 accurately locate and center the pins 24 and 19 along an exact diameter of the bore 17 being measured.

Meanwhile, the motion of the movable measuring pin 24 as it enters the bore 17 is transmitted to the ball 29, which responds to this motion by moving up the incline 30 of the plug 31. This action shifts the rod 33 and plunger 42 upward, causing the needle 46 of the dial indicator 12 to indicate the dimension of the bore 17.

When the measurement has been observed and recorded, if desired, the operator lifts the head 10 and its associated parts out of the bore 17, whereupon the coil springs 55 push the locating pins 48 outwardly to their extended positions. The spring (not shown) within the dial indicator 12 at the same time pushes the plunger 42 thereof downwardly, likewise pushing the rod 33 and ball 29 downwardly so as to urge the movable measuring pin 24 outwardly to its normal position.

While I have shown and described my invention in detail, it is to be understood that the same is to be limited only by the appended claims, for many changes may be made without departing from the spirit and scope of my invention.

What I claim is:

1. An equalizing and aligning mechanism for a gauge head, comprising a pair of spaced bore-engaging locating plungers reciprocably mounted in said head and projecting from one side thereof with their longitudinal axes disposed substantially in a common plane, and gearing including rack teeth connected to said plungers, a shaft disposed transversely to said plungers, and spaced pinion portions on said shaft meshing with said rack teeth and positively interconnecting said plungers, the longitudinal axis of said shaft being disposed substantially parallel to said common plane of said plunger axes and traverse to said plunger axes, whereby to synchronize the motion of one plunger relatively to the other plunger.

2. An equalizing and aligning mechanism for a gauge head, comprising a pair of spaced bore-engaging locating plungers reciprocably mounted in said head and projecting from one side thereof with their longitudinal axes disposed substantially in a common plane, and gearing including rack teeth connected to said plungers and a bridging pinion disposed transversely to said plungers and meshing with said teeth and positively interconnecting said plungers, the longitudinal axis of said pinion being disposed substantially parallel to said common plane of said plunger axes and transverse to said plunger axes, whereby to synchronize the motion of one plunger relatively to the other plunger.

3. An equalizing and aligning mechanism for a gauge head, comprising a pair of spaced bore-engaging locating plungers reciprocably mounted in said head and projecting from one side thereof with their longitudinal axes disposed substantially in a common plane, and gearing including rack teeth integral with said plungers and an elongated pinion disposed transversely of said plungers and meshing at its opposite ends with said rack teeth and positively interconnecting said plungers, the longitudinal axis of said pinion being disposed substantially parallel to said common plane of said plunger axes and transverse to said plunger axes, whereby to synchronize the motion of one plunger relatively to the other plunger.

4. An equalizing and aligning mechanism for a gauge head, comprising a pair of spaced bore-engaging locating plungers with rack teeth thereon reciprocably mounted in said head and projecting from one side thereof with their longitudinal axes disposed substantially in a common plane, spaced slides slidably mounted in said head for motion transversely to the direction of motion of said plungers, spaced bearings mounted in said slides adjacent and transverse to the paths of travel of said plungers, pinion gearing journaled in said bearings in mesh with said rack teeth and positively interconnecting said plungers whereby to synchronize the motion of one plunger relatively to the other plunger, and clamping members mounted in said head in clamping engagement with said slides for clamping said slides after the adjustment of said pinion gearing relatively to said rack teeth.

5. An equalizing and aligning mechanism for a gauge head, comprising a pair of spaced bore-engaging locating plungers with rack teeth thereon reciprocably mounted in said head and projecting from one side thereof with their longitudinal axes disposed substantially in a common plane with their axes of reciprocation disposed at an acute angle to one another, and pinion gearing in mesh with said rack teeth and positively interconnecting said plungers whereby to synchronize the motion of one plunger relatively to the other plunger.

6. An equalizing and aligning mechanism for a gauge head, comprising a pair of spaced bore-engaging locating plungers reciprocably mounted in said head and projecting from one side thereof with their longitudinal axes disposed substantially in a common plane with their axes of reciprocation disposed at an acute angle to one another, rack teeth disposed obliquely on said plungers and pinion mechanism meshing with said rack teeth and positively interconnecting said plungers whereby to synchronize the motion of one plunger relatively to the other plunger.

7. An equalizing and aligning mechanism for a gauge head, comprising a pair of spaced bore-engaging locating plungers reciprocably mounted in said head and projecting from one side thereof with their longitudinal axes disposed substantially in a common plane with their axes of reciprocation disposed at an acute angle to one another, spaced slides slidably mounted in said head for motion transverse to the direction of motion of said plungers, and gearing including rack teeth connected to said plungers a shaft journaled in said slides having pinion portions thereon in mesh with said rack teeth and positively interconnecting said plungers, said rack teeth being disposed obliquely relatively to the axes of reciprocation of said plungers whereby to synchronize the motion of one plunger relatively to the other plunger, and clamping members mounted in said head in clamping engagement with said slides for clamping said slides after the adjustment of said pinion gearing relatively to said rack teeth.

8. An equalizing and aligning mechanism for a gauge head, comprising a pair of spaced bore-engaging locating plungers reciprocably mounted in said head and projecting from one side thereof with their longitudinal axes disposed substantially in a common plane with their axes of reciprocation disposed parallel to one another, and gearing positively interconnecting said plungers whereby to synchronize the motion of one plunger relatively to the other plunger.

9. An equalizing and aligning mechanism for a gauge head, comprising a pair of spaced bore-engaging locating plungers reciprocably mounted in said head and projecting from one side thereof with their longitudinal axes disposed substantially in a common plane with their axes of reciprocation disposed parallel to one another, and gearing including rack teeth connected to said plungers and pinion mechanism meshing with said rack teeth and positively interconnecting said plungers whereby to synchronize the motion of one plunger relatively to the other plunger.

ANDREW EISELE.

REFERENCES CITED

The following references are of record in the file of this patent:

UNITED STATES PATENTS

| Number | Name | Date |
| --- | --- | --- |
| 188,803 | Kuhlman | Mar. 27, 1877 |
| 279,534 | Byrne | June 19, 1883 |
| 414,954 | Suerstedt | Nov. 12, 1889 |
| 739,877 | Hoyle et al. | Sept. 29, 1903 |
| 1,290,770 | Mayobb | Jan. 7, 1919 |
| 1,359,335 | Crane | Nov. 16, 1920 |
| 1,703,736 | Jacob | Feb. 26, 1929 |
| 2,095,405 | Aldeborgh et al. | Oct. 12, 1937 |
| 2,150,070 | Kregecz | Mar. 7, 1939 |
| 2,424,497 | Nilsson | July 22, 1947 |

FOREIGN PATENTS

| Number | Country | Date |
| --- | --- | --- |
| 236,670 | Germany | July 8, 1911 |
| 405,871 | Great Britain | Feb. 15, 1934 |